(12) United States Patent
Lim

(10) Patent No.: US 7,374,202 B2
(45) Date of Patent: May 20, 2008

(54) ASSEMBLY STRUCTURE OF AIRBAG CASE

(75) Inventor: Gyu Sung Lim, Seoul (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 88 days.

(21) Appl. No.: 10/650,750

(22) Filed: Aug. 29, 2003

(65) Prior Publication Data
US 2005/0035576 A1 Feb. 17, 2005

(30) Foreign Application Priority Data
Aug. 14, 2003 (KR) .................. 10-2003-0056459

(51) Int. Cl.
*B60R 21/203* (2006.01)
*B60R 21/215* (2006.01)
(52) U.S. Cl. ............... 280/731; 280/728.3; 280/728.2
(58) Field of Classification Search ............... 280/731, 280/728.2, 728.3
See application file for complete search history.

(56) References Cited

U.S. PATENT DOCUMENTS

| | | | | |
|---|---|---|---|---|
| 4,325,568 A | * | 4/1982 | Clark et al. ................. | 280/731 |
| 5,569,893 A | * | 10/1996 | Seymour ................. | 200/61.54 |
| 5,577,766 A | * | 11/1996 | Niwa et al. ................. | 280/731 |
| 5,577,768 A | * | 11/1996 | Taguchi et al. ............. | 280/735 |
| 5,630,617 A | * | 5/1997 | Hashiba ................. | 280/731 |
| 5,685,557 A | * | 11/1997 | Persson et al. .......... | 280/728.2 |
| 5,725,241 A | * | 3/1998 | Schenck ................. | 280/731 |
| 5,762,365 A | * | 6/1998 | Worrell et al. ............. | 280/731 |
| 6,237,944 B1 | * | 5/2001 | Worrell et al. ............. | 280/731 |
| 6,247,722 B1 | * | 6/2001 | Brodi et al. ............. | 280/728.3 |
| 6,250,666 B1 | * | 6/2001 | Ross ................. | 280/728.2 |
| 6,354,622 B1 | * | 3/2002 | Ulbrich et al. ............. | 280/731 |
| 6,443,482 B2 | * | 9/2002 | Yamamoto et al. ...... | 280/728.1 |

FOREIGN PATENT DOCUMENTS

| | | | |
|---|---|---|---|
| JP | 2001-180502 | * | 7/2001 |
| JP | 2003-200805 | * | 7/2003 |

OTHER PUBLICATIONS

English Language Abstract of JP 2001-180502.
English Language Abstract of JP 2003-200805.

* cited by examiner

*Primary Examiner*—Ruth Ilan
*Assistant Examiner*—George D. Spisich
(74) *Attorney, Agent, or Firm*—Greenblum & Bernstein, P.L.C.

(57) ABSTRACT

An assembly structure of an airbag case includes a steering wheel core mounted to a hub of a steering wheel, the hub having an open top part and a retainer attached to the steering wheel core that retains an airbag and an inflator supplying a high-pressure gas to the airbag. An airbag cover is disposed on the hub of the steering wheel so that the airbag cover covers the open top part of the hub of the steering wheel and has a tear line formed thereat, the airbag cover being severed along the tear line when the airbag is expanded, and a plurality of hooks are formed at the edge of the airbag cover.

6 Claims, 4 Drawing Sheets

ASSEMBLY STRUCTURE OF AIRBAG CASE

BACKGROUND OF THE INVENTION

1. Field of the Invention

The present invention relates to an airbag device for vehicles, and more particularly to an assembly structure of an airbag case wherein the edge of an airbag cover is hooked on a steering wheel, and a retainer is attached to a steering wheel core by means of bolts.

2. Description of the Related Art

Generally, an airbag device is a device mounted to a steering wheel of a vehicle for protecting a driver from injury when a collision of the vehicle occurs. Also, the airbag device is mounted to the steering wheel in such a manner that it is vertically moved, whereby the airbag device serves to turn on/off a horn switch mounted in the steering wheel.

FIG. 1 is a perspective view showing a conventional assembly structure of an airbag case, and FIG. 2 is a side view, in section, of the conventional assembly structure of the airbag case.

As shown in FIGS. 1 and 2, the conventional airbag device for vehicles comprises: an airbag case 10 to 13 mounted to a hub 2 of a steering wheel 1; an inflator 14 for supplying a high-pressure gas when a vehicle collision is detected by means of an impact sensor; and an airbag 16 expanding toward a passenger when the gas is supplied from the inflator 14 to the airbag 16.

The hub 2 of the steering wheel 1 is formed in such a manner that the width of the hub 2 is gradually increased from the lower part thereof to the upper part thereof. The hub 2 has an open top part and a bottom part, through which a hub hole 2A is formed. Inside the hub 2 is mounted a steering wheel core 4, which is extended to a rim 3 of the steering wheel 1.

The airbag case 10 to 13 comprises: an airbag cover 10 for covering the open top part of the hub 2 of the steering wheel 1; a retainer 11 disposed on the steering wheel core 4 for retaining the inflator 14 and the airbag 16; a rib 12 protruded from the airbag cover 10 in such a manner that the rib 12 surrounds the retainer 11, the rib 12 being attached to the retainer 11 by means of rivets 20; and brackets 13 attached to the rib 12 and the retainer 11 by means of the rivets 20 and attached to the steering wheel core 4 by means of bolts 22.

At the airbag cover 10 is formed a tear line 17. More specifically, the tear line 17 is formed at the rib-inside area 10A of the airbag cover 10, which is placed inside the rib 12. Consequently, the airbag cover 10 is severed along the tear line 17 when the airbag 16 is expanded.

The retainer 11 is mounted coaxially with the airbag cover 10. In other words, the retainer 11 and the airbag cover have the same central axis C. The width 11W of the retainer 11 is approximately ½ of the width 10W of the airbag cover 20. The rib 12 is formed halfway between the central axis C and the edge of the airbag cover 10 so that the rib 12 comes in contact with a sidewall 11A of the retainer 11. Consequently, the rib-inside area 10A of the airbag cover 10, which is placed inside the rib 12, corresponds exactly to the area where the tear line is formed. In other words, the area of the airbag cover 10 within the tear line 17 is approximately ½ of the area of the entire airbag cover 10.

The operation of the conventional assembly structure of the airbag case with the above-stated construction will now be described.

When a vehicle collision is detected by means of the impact sensor, the high-pressure gas is supplied from the inflator 14 to the airbag 16. As the gas is filled in the airbag 16, the airbag 16 is expanded so that the airbag cover 10 is severed along the tear line 17, and is then fully expanded toward a passenger.

In the conventional assembly structure of the airbag case, the shape of the tear line 17 is experimentally designed since the expansion performance of the airbag 16 is affected by the shape of the tear line 17. However, the area of the airbag cover 12 within the tear line 17 is limited to approximately ½ of the area of the entire airbag cover 10 due to the rib 12. Consequently, the expansion performance of the airbag 16 may be improved only restrictively.

To the airbag cover 10 is mounted a membrane type horn switch 18, by which a horn sounding an alarm is operated. The horn switch 18 is disposed inside the rib 12 so that interference between the horn switch 18 and the rib 12 is prevented. As a result, an area in which the horn switch 18 can be disposed and operated is limited.

The conventional assembly structure of the airbag case provides no additional supporting member for supporting the edge of the airbag cover 10. As a result, the edge of the airbag cover 10 is loosened from the steering wheel 1, which leads to poor appearance. The rib 12 is formed at a distance from the edge of the airbag cover 10, and therefore the edge of the airbag cover 10 in not securely and reliably supported by the rib 12.

In the conventional assembly structure of the airbag case, the rib 12, the retainer 11, and the brackets 13 are fastened together by means of the rivets 20, and then the brackets 13 are attached to the steering wheel core 4 by means of the bolts 22. In this way, the airbag case 10 to 13 is assembled with the steering wheel 1, whereby the number of the parts to be assembled is large, additional tools for rivet 20 and bolt 22 works are required, and thus the cost and time of assembly are increased.

SUMMARY OF THE INVENTION

Therefore, the present invention has been made in view of the above problems, and it is an object of the present invention to provide an assembly structure of an airbag case wherein an area defined by a tear line is large and thus an operation area of a horn switch is large, its assembly operation is simplified, and its external appearance is appealing and smooth.

In accordance with the present invention, the above and other objects can be accomplished by the provision of an assembly structure of an airbag case, comprising: a steering wheel core mounted to a hub of a steering wheel, the hub having an open top part; a retainer attached to the steering wheel core for retaining an airbag and an inflator supplying a high-pressure gas to the airbag; an airbag cover disposed on the hub of the steering wheel so that the airbag cover covers the open top part of the hub of the steering wheel and having a tear line formed thereat, the airbag cover being severed along the tear line when the airbag is expanded; and hooks formed adjacent the edge of the airbag cover, wherein the airbag cover is securely fixed to the steering wheel by the hooks.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a first preferred embodiment of the present invention will be described in detail with reference to FIG. 3.

Figure 1:
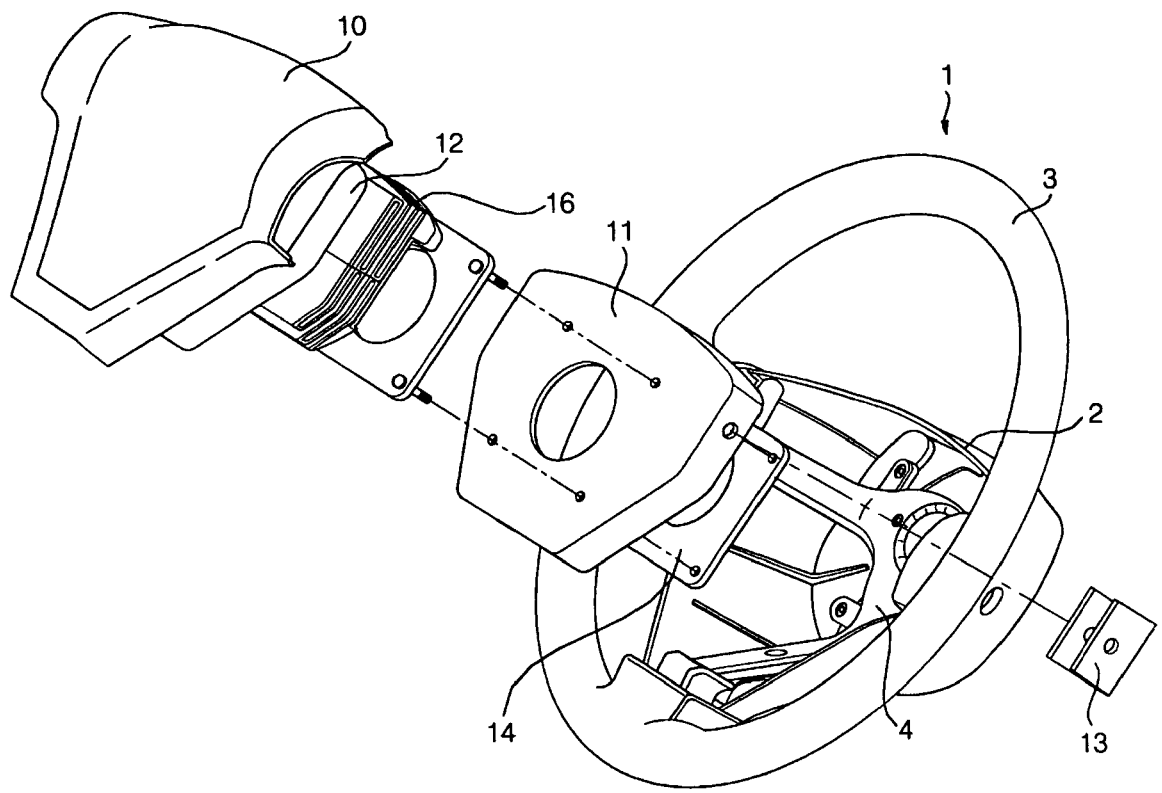
FIG. 1 is a perspective view showing a conventional assembly structure of an airbag case.
Figure 2:
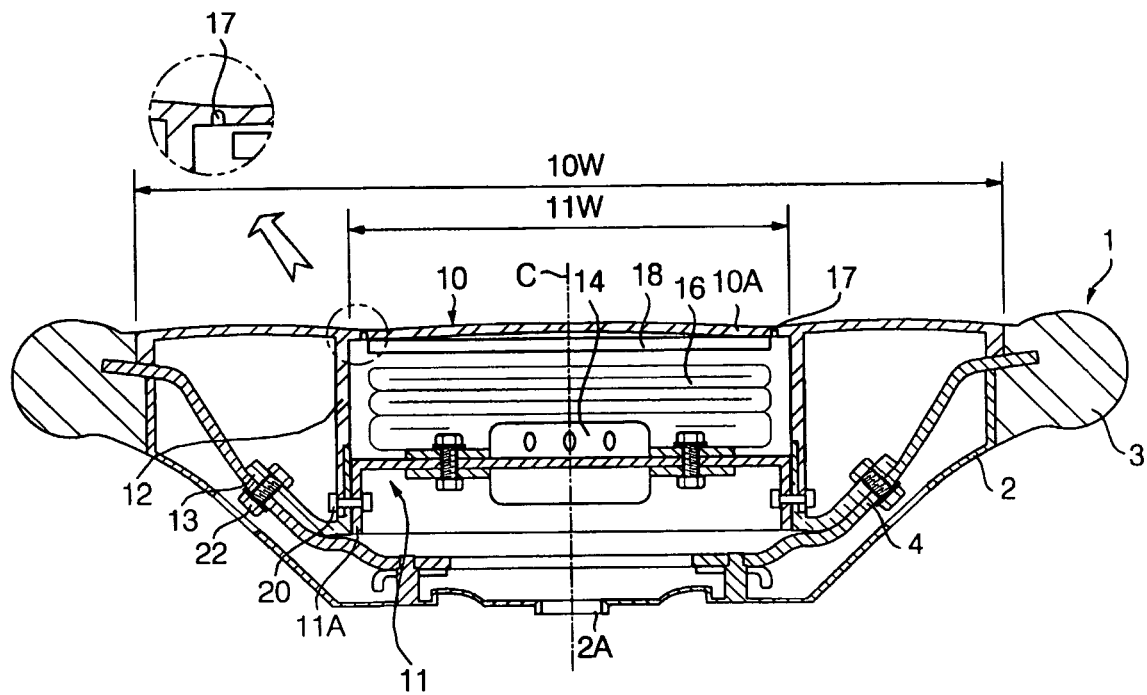
FIG. 2 is a side view, in section, of the conventional assembly structure of the airbag case.
Figure 3:
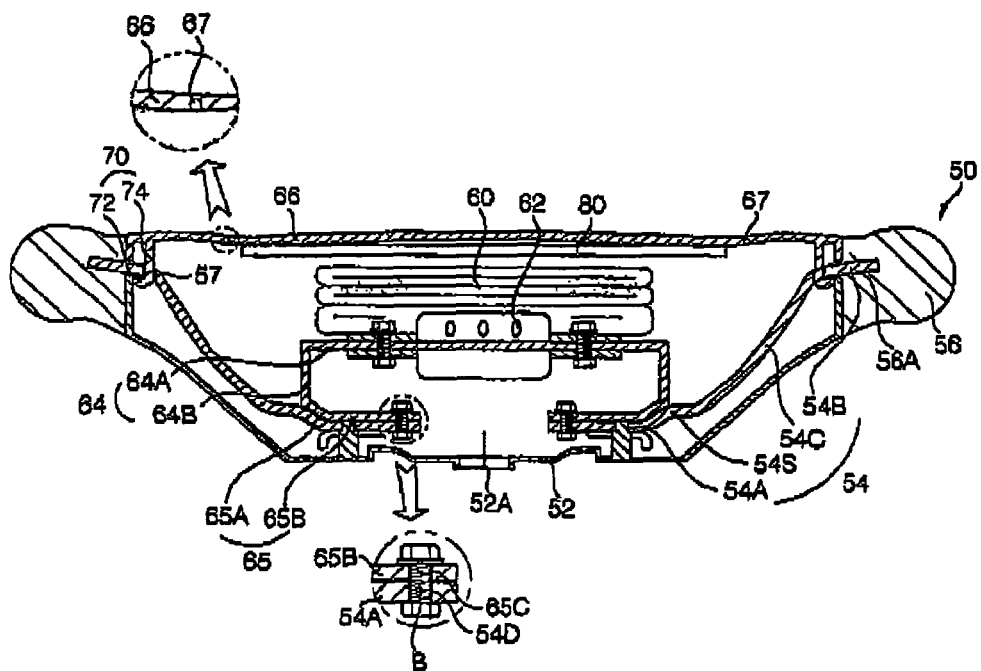
FIG. 3 is a side view, in section, of an assembly structure of an airbag case according to a first preferred embodiment of the present invention.

FIG. 3 is a side view, in section, of an assembly structure of an airbag case according to a first preferred embodiment of the present invention.

The assembly structure of the airbag case according to the first preferred embodiment of the present invention comprises a steering wheel core 54 mounted to a hub 52, which has an open top part, of a steering wheel 50. To the steering wheel core 54 is attached a retainer 64 for retaining an airbag 60 and an inflator 62. On the hub 52 of the steering wheel 50 is disposed an airbag cover 66, which covers the open top part of the hub 52 of the steering wheel 50. Adjacent the edge of the airbag cover 66 are formed hooks 70, which are vertically extended toward the hub 52 of the steering wheel 50. The airbag cover 66 is fitted with the upper sidewall of the steering wheel 50 by the hooks 70 adjacent the edge thereof.

The hub 52 of the steering wheel 50 is formed in such a manner that the width of the hub 52 is gradually increased from the lower part thereof to the upper part thereof. The hub 52 has a bottom part through which a hub hole 52A is formed. The steering wheel core 54 comprises: a horizontal panel 54A disposed in parallel with the bottom surface of the hub 52 of the steering wheel 50 while the horizontal panel 54A is spaced a prescribed distance from the bottom surface of the hub 52 of the steering wheel 50, the horizontal panel 54A comprising a lower horizontal panel part, an upper horizontal panel part, and an inclined connection part 54S; and a plurality of inclined panels 54C formed integrally with the upper horizontal panel part of the horizontal panel 54A. The inclined panels 54C are inclined upwardly and outwardly. Each of the inclined panels 54C has an upper end 54B bent outwardly with slow curvature. The upper ends 54B of the inclined panels 54C are inserted into core holes 56A formed at a rim 56 of the steering wheel 50, respectively.

At the upper ends 54B of the inclined panels 54C are formed hook holes 57, through which the hooks 70 of the airbag cover 66 are vertically inserted, respectively. Preferably, the hook holes 57 are vertically formed so that the hooks 70 are easily inserted through the hook holes 57, respectively.

The retainer 64 comprises: a top retainer part 64A disposed above the horizontal panel 54A of the steering wheel core 54 while the top retainer part 64A is disposed in parallel with the horizontal panel 54A of the steering wheel core 54, the top retainer part 64A having a hole formed at the central area thereof, through which the inflator 62 is inserted so that the inflator 62 is fitted in the hole of the top retainer part 64A; and a sidewall 64B formed in the shape of a ring from the edge of the top retainer part 64A toward the horizontal panel 54A of the steering wheel core 54 so that the sidewall 64B of the retainer 64 is disposed on the inclined connection part 54S of the horizontal panel 54A of the steering wheel core 54. To the top retainer part 64A of the retainer 64 is attached the airbag 60 by means of bolts.

At the retainer is integrally formed a flange 65, which is inwardly bent from the lower end of the sidewall 64B of the retainer 64 toward the inside of the retainer 64 in such a manner that the flange 65 comes in surface contact with the horizontal panel 54A of the steering wheel core 54.

The flange 65 comprises: an inclined panel 65A formed at the lower end of the sidewall 64B of the retainer 64 while the inclined panel 65A is bent at a prescribed angle so that the inclined panel 65A comes in contact with the inclined connection part 54S of the horizontal panel 54A of the steering wheel core 54; and a horizontal panel 65B inwardly extended from the end of the inclined panel 65A while the horizontal panel 65B is in parallel with the horizontal panel 54A of the steering wheel core 54 so that the horizontal panel 65B comes in contact with the lower horizontal panel part of the horizontal panel 54A of the steering wheel core 54.

At the horizontal panel 65B of the flange 65 is formed at least one first bolt hole 65C. Similarly, at the horizontal panel 54A of the steering wheel core 54 is formed at least one second bolt hole 54D, which vertically corresponds to the first bolt hole 65C of the horizontal panel 65B of the flange 65. Through not only the first bolt hole 65C but also the second bolt hole 54D is inserted a bolt B, by which the retainer 64 is securely fixed to the steering wheel core 54.

Each of the hooks 70 is preferably made of a plastic material with an elastic force so that the hooks 70 are easily engaged with or disengaged from the corresponding hook holes 57 by the elastic force. Each of the hooks 70 comprises: a supporting protrusion 74 provided adjacent the edge of the airbag cover 66 and vertically extending toward the hub 52 of the steering wheel 50, the supporting protrusion 72 being inserted through the corresponding hook hole 57; and a hooking end 74 formed at the end of the supporting protrusion 72, the hooking end 74 being inserted through the corresponding hook hole 57 by the elastic force and caught by the steering wheel core 54.

At the airbag cover is formed a tear line 67, by which the airbag cover is easily severed when the airbag 60 is expanded. As described above, the hooks 70 are formed adjacent the edge of the airbag cover 66. Consequently, an area of the airbag cover 66 where the tear line 67 is formed is considerably increased as compared to the aforesaid conventional art. In other words, the area of the airbag cover 66 within the tear line 67 approximately corresponds to the area of the entire airbag cover 66.

To the lower surface of the airbag cover 66 is mounted a membrane type horn switch 80, which is elastically deformed in the lower direction to be switched on when a driver pushes down the airbag cover 66. The airbag cover 66 is elastically deformed with the hooks as supporting points. As described above, the hooks are formed adjacent the edge of the airbag cover 66 according to the present invention. Consequently, an area in which the membrane type horn switch 80 can be disposed and operated is considerably increased as compared to the conventional art.

The airbag cover 66 is made of a plastic material with an elastic force. Consequently, the airbag cover 66 is elastically deformed in the lower direction when the airbag cover 66 is pushed down so that the membrane type horn switch 80 is turned on, and is restored to the original state when the pushing operation of the airbag cover 66 is stopped so that the membrane type horn switch 80 is turned off. Preferably, not only the airbag cover 66 but also the hooks 70 are made of a plastic material with an elastic force.

The airbag cover 66 is securely supported while the airbag cover 66 is not loosened adjacent the edge thereof from the steering wheel 50 since the hooks 70 are formed adjacent the edge of the airbag cover 66.

The assembly operation of the airbag case with the above-stated construction according to the present invention will now be described.

First, the retainer 64 is disposed inside the hub 52 of the steering wheel 50 so that the first bolt hole 65C of the horizontal panel 65B of the flange 65 vertically corresponds to the second bolt hole 54D of the horizontal panel 54A of the steering wheel core 54, and then the bolt B is inserted through the first and second bolt holes 65C and 54D. In this way, the retainer is mounted to the steering wheel core 54.

Next, the inflator 64 and the airbag 62 are attached to the retainer 64, and then the airbag cover 66 is pushed toward the hub 52 of the steering wheel 50. As a result, the hooks 70 are inserted through the hook holes 57, respectively, by which the airbag cover 66 is fitted with the steering wheel core 54. Consequently, the assembly operation of the airbag case is completed.

Figure 4:
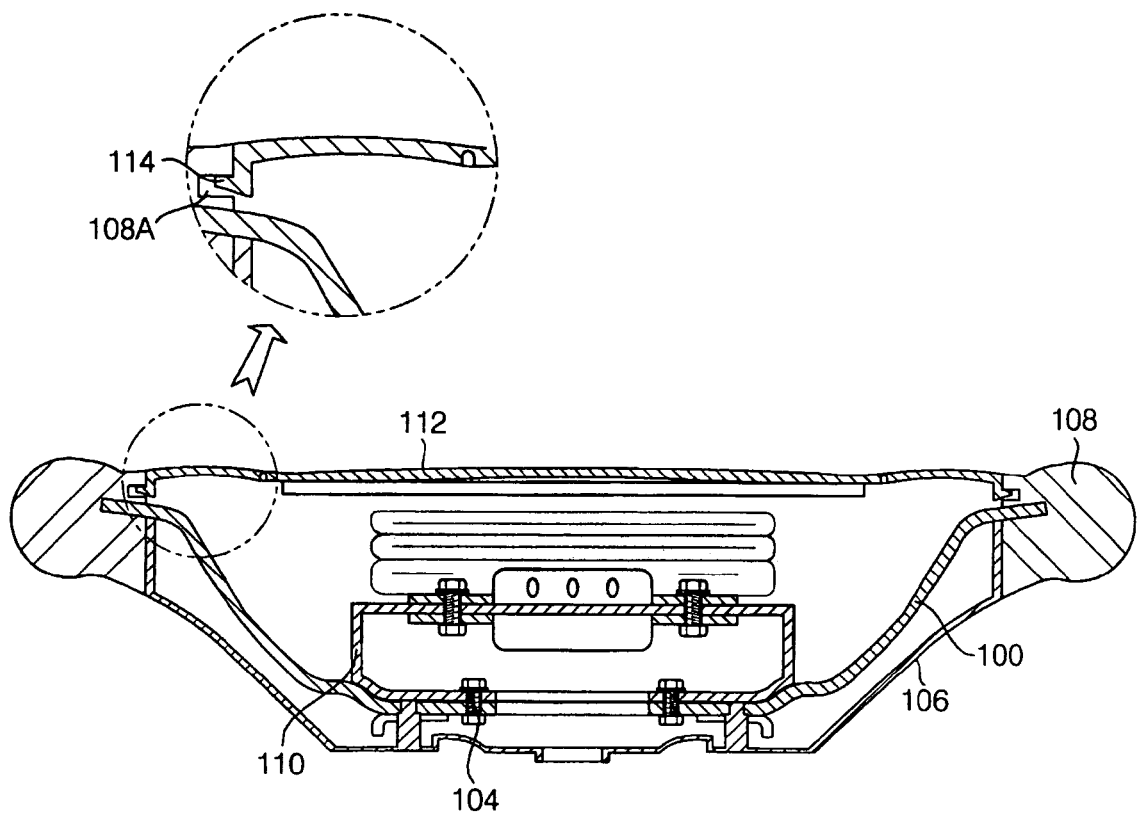
FIG. 4 is a side view, in section, of an assembly structure of an airbag case according to a second preferred embodiment of the present invention.

FIG. 4 is a side view, in section, of an assembly structure of an airbag case according to a second preferred embodiment of the present invention. The assembly structure according to the second preferred embodiment of the present invention is very similar to that according to the first preferred embodiment of the present invention, and thus only the detailed description of the difference between the second preferred embodiment of the present invention and the first preferred embodiment of the present invention will be given.

As shown in FIG. 4, the assembly structure of the airbag case according to the second preferred embodiment of the present invention comprises a retainer 110 mounted to a core 100 of a steering wheel by bolts 104. To a hub 106 of the steering wheel is attached an airbag cover 112. Adjacent the edge of the airbag cover 112 are formed hooks 114, which are protruded from the edge of the airbag cover 112 toward a rim 108 of the steering wheel. The hooks 114 are fitted into hook holes 108A formed at the rim 108 of the steering wheel so that the airbag cover 112 is fixed to the steering wheel.

As apparent from the above description, the present invention provides an assembly structure of an airbag case wherein a retainer is attached to a steering wheel core by bolts, and hooks formed adjacent the edge of an airbag cover are inserted through hook holes formed at the upper part of a steering wheel so that the airbag cover is fixed to the steering wheel, whereby the number of the parts to be assembled is decreased, the assembly operation is simplified, and thus the cost of assembly is reduced.

According to the present invention, the airbag cover is securely supported while the airbag cover is not loosened adjacent the edge thereof from the steering wheel since the hooks are formed adjacent the edge of the airbag cover, whereby its external appearance is appealing and smooth.

Furthermore, a tear line can be formed in such a manner that the area of the airbag cover within the tear line approximately corresponds to the area of the entire airbag cover since the hooks are formed adjacent the edge of the airbag cover, whereby the tear line can be designed in various ways, and thus the expansion performance of an airbag is improved.

According to the present invention, a membrane type horn switch can be mounted to the airbag cover over the entire area of the airbag cover since the hooks are formed adjacent the edge of the airbag cover, whereby design of the membrane type horn switch is not restricted, an operation area of the membrane type horn switch is increased, and thus the membrane type horn switch can be conveniently operated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An assembly structure of an airbag case, comprising:
   a steering wheel core mounted to a hub of a steering wheel, the hub having an open top part;
   a retainer attached to the steering wheel core that retains an airbag and an inflator supplying a high-pressure gas to the airbag;
   a generally planar airbag cover disposed on the hub of the steering wheel so that the airbag cover covers the open top part of the hub of the steering wheel and having a tear line formed thereat, the airbag cover being severed along the tear line when the airbag is expanded; and
   a plurality of hooks formed adjacent an outer edge of the airbag cover, wherein the airbag cover is securely fixed to the steering wheel by the hooks,
   wherein the steering wheel includes a rim having a plurality hook holes and the hooks are confugired to be secured to the hook holes.

2. The structure as set forth in claim 1, wherein the tear line is formed at the airbag cover between the center of the airbag cover and the edge of the airbag cover where the hooks are formed.

3. The structure as set forth in claim 1, further comprising a horn switch mounted to the airbag cover within the edge of the airbag cover where the hooks are formed.

4. The structure as set forth in claim 1, wherein the hooks are made of a plastic material with an elastic force so that the hooks are inserted through the plurality of corresponding hook holes by the elastic force, and the airbag cover is made of a plastic material with an elastic force.

5. The structure as set forth in claim 1, wherein each of the hooks comprises:
   a protrusion vertically extended from the edge of the airbag cover toward the hub of the steering wheel; and
   a hooking end formed at the end of the protrusion, the hooking end being inserted through a corresponding hook hole.

6. The structure as set forth in claim 1, wherein each of the hooks is protruded from the edge of the airbag cover toward a rim of the steering wheel in the lateral direction of the airbag, and the hook holes being opened in the protruded direction of the hooks so that the hooks are inserted into the hook holes, respectively.

* * * * *

UNITED STATES PATENT AND TRADEMARK OFFICE
CERTIFICATE OF CORRECTION

PATENT NO. : 7,374,202 B2
APPLICATION NO. : 10/650750
DATED : May 20, 2008
INVENTOR(S) : Gyu Sung Lim It is certified that error appears in the above-identified patent and that said Letters Patent is hereby corrected as shown below:

At column 6, line 29, (claim 1, line 12) of the printed patent, change "adjacent" to -- at --.

At column 6, line 33, (claim 1, line 16) of the printed patent, change "confugired" to -- configured --.

Signed and Sealed this

Twenty-second Day of September, 2009

David J. Kappos
*Director of the United States Patent and Trademark Office*